United States Patent
D'Angelo et al.

(10) Patent No.: US 9,768,717 B2
(45) Date of Patent: Sep. 19, 2017

(54) METHOD OF DRIVING BRUSHLESS MOTORS, CORRESPONDING DEVICE, MOTOR AND COMPUTER PROGRAM PRODUCT

(71) Applicant: STMICROELECTRONICS S.R.L., Agrate Brianza (IT)

(72) Inventors: Giuseppe D'Angelo, Tufino (IT); Virginia Clemente, Montesarchio (IT); Michele Bisogno, Cava de Tirreni (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 71 days.

(21) Appl. No.: 14/855,726

(22) Filed: Sep. 16, 2015

(65) Prior Publication Data

US 2016/0173014 A1   Jun. 16, 2016

(30) Foreign Application Priority Data

Dec. 15, 2014  (IT) .......................... TO2014A001038

(51) Int. Cl.
| | |
|---|---|
| *H02P 6/18* | (2016.01) |
| *H02P 6/14* | (2016.01) |
| *H02P 6/182* | (2016.01) |
| *H02P 27/08* | (2006.01) |

(52) U.S. Cl.
CPC ............... *H02P 6/14* (2013.01); *H02P 6/182* (2013.01); *H02P 27/08* (2013.01)

(58) Field of Classification Search
USPC ..... 318/400.05, 400.34, 400.35, 601, 400.06
See application file for complete search history.

(56) References Cited

U.S. PATENT DOCUMENTS

| | | | | |
|---|---|---|---|---|
| 5,367,234 A | * | 11/1994 | DiTucci | H02P 6/182 318/400.06 |
| 5,616,996 A | * | 4/1997 | Tang | H02P 6/15 318/400.04 |
| 6,462,495 B1 | | 10/2002 | Copeland | |

(Continued)

OTHER PUBLICATIONS

Yen-Shin Lai and Yong-Kai Lin, hereafter "Yen" (A Unified Approach to Zero-Crossing Point Detection of Back EMF for Brushless DC Motor Drives without Current and Hall Sensors). IEEE Transactions on Power Electronics, vol. 26, No. 6, Jun. 2011.*

(Continued)

*Primary Examiner* — Jorge L Carrasquillo
(74) *Attorney, Agent, or Firm* — Slater Matsil, LLP

(57) ABSTRACT

A driver device for driving a DC motor using PWM modulated drive signals includes comparator circuits for producing digitalized Back-EMF signals having first and second values as a function of the Back-EMF signals being above or below a respective threshold, and an inverter for driving the PWM modulated drive signals in a phased relationship with the digitalized Back-EMF signals. The driver device also includes controller circuits configured for controlling the respective threshold by minimizing the error between a time measured between two consecutive opposed edges of the digitalized Back-EMF signal and half a time measured between two consecutive homologous edges of the digitalized Back-EMF signal.

20 Claims, 3 Drawing Sheets

(56) References Cited

U.S. PATENT DOCUMENTS

| | | | | |
|---|---|---|---|---|
| 7,529,055 | B1* | 5/2009 | Laks | G11B 5/59627 360/75 |
| 8,917,043 | B2* | 12/2014 | Reynolds | H02P 6/10 318/400.06 |
| 2006/0152181 | A1 | 7/2006 | Shao et al. | |
| 2006/0186846 | A1* | 8/2006 | Lassen | H02P 6/182 318/400.21 |
| 2008/0252238 | A1* | 10/2008 | Otaguro | G11B 19/28 318/400.05 |
| 2008/0252240 | A1* | 10/2008 | Sugie | H02P 6/15 318/400.06 |
| 2010/0253265 | A1* | 10/2010 | Clothier | A47L 5/26 318/400.14 |
| 2011/0084640 | A1* | 4/2011 | Brown | H02P 6/185 318/400.35 |
| 2013/0193894 | A1* | 8/2013 | Kiguchi | H02P 29/0241 318/490 |
| 2015/0042251 | A1* | 2/2015 | Suzuki | H02P 6/16 318/400.11 |
| 2015/0171780 | A1* | 6/2015 | Ko | H02P 6/182 318/400.06 |

OTHER PUBLICATIONS

Yen-Shin Lai et al: "A Unified Approach to Zero-Crossing Point Detection of Back EMF for Brushless DC Motor Drives without Current and Hall Sensors". IEEE Transactions on Power Electronics. Institute of Electrical and Electronics Engineers. USA. vol. 26. No. 6. Jun. 1, 2011 (Jun. 1, 2011), pp. 1704-1713. XP011336125. ISSN: 0885-8993. DOI: 10.1109/TPEL.2010.2081379.

J. Shao: "An Improved Microcontroller-Based Sensorless Brushless DC (BLDC) Motor Drive for Automotive Applications". IEEE Transactions on Industry Applications. vol. 42. No. 5. Sep. 1, 2006 (Sep. 1, 2006). pp. 1216-1221. XP055208307. ISSN: 0093-9994. 001: 10.1109/TIA.2006.880888.

* cited by examiner

METHOD OF DRIVING BRUSHLESS MOTORS, CORRESPONDING DEVICE, MOTOR AND COMPUTER PROGRAM PRODUCT

FIELD OF THE INVENTION

The present invention relates to techniques for driving brushless motors. One or more embodiments may apply to controlling brushless DC (BLDC) motors.

BACKGROUND

In recent years, brushless DC (BLDC) motors have been receiving increasing interest, e.g., for automotive applications. This is due to the higher reliability/longevity, lower maintenance, and quieter operation that a BLDC may have in comparison with its "brushed" DC counterpart. Over the last decade, continuing improvements in power semiconductors and controller ICs as well as the production of permanent-magnet brushless motors have made it possible to manufacture reliable, cost-effective solutions for a broad range of adjustable speed applications.

Applications for which BLDC motors are being designed or currently used include, e.g., power steering, engine cooling fans, fuel/water pumps, air-conditioning compressors, heating, ventilating, and air-conditioning (HVAC) blower motors.

The "phases" of a BLDC motor may be fed with currents subjected to pulse width modulation (PWM) with a variable duty cycle. Control of a BLDC motor may involve sensing the back electro-motive force (Back-EMF), which may occur both during PWM on-time and during PWM off-time.

Back-EMF zero-cross detection during PWM-on time may be critical.

A notionally correct comparison threshold for that purpose is half the DC bus voltage $V_{DC}/2$ for each motor phase. Certain factors such as, e.g., the variable attenuation introduced by low-pass filtering according to motor speed and the use of low precision resistors for voltage dividers in low-cost application, may result in a correct comparison threshold which is different from the theoretical value and which may be different for each motor phase.

The use of a wrong comparison threshold may result in timing errors for inverter three-phase commutation. These timing errors may produce various drawbacks such as, e.g., an increase of power consumption at a fixed motor speed, an increase of audible noise, and an increase of speed ripple.

For that reason, Back-EMF sensing during PWM off-time may be preferred. However, Back-EMF sensing during PWM off-time requires that a minimum PWM "off" time should be present, so that the PWM duty cycle is constrained to less than 100%. In various applications, this may represent an unacceptable drawback.

SUMMARY

In a particular embodiment, a method of driving a DC motor by PWM modulated drive signals is disclosed. The method includes producing digitalized Back-EMF signals having first and second values as a function of the digitalized Back-EMF signals being above or below a respective threshold, and driving the PWM modulated drive signals in a phased relationship with the digitalized Back-EMF signals. The digitalized Back-EMF signals have a first time between two consecutive homologous edges of the digitalized Back-EMF signals and a second time between two consecutive opposed edges of the digitalized Back-EMF signals. The method also includes controlling the respective threshold by reducing an error between the second time and a fraction of the first time.

In another particular embodiment, a driver device for driving a DC motor by PWM modulated drive signals is disclosed. The driver device includes a plurality of comparator circuits configured to produce digitalized Back-EMF signals having first and second values as a function of said Back-EMF signals being above or below a respective threshold, and an inverter configured to drive said PWM modulated drive signals in a phased relationship with said digitalized Back-EMF signals. The driver device also includes controller circuits configured to control said respective threshold.

In another particular embodiment, a computer program product having non-transitory computer readable medium storing instructions is disclosed. The instructions, when executed, are configured to cause at least one processor to produce digitalized Back-EMF signals having first and second values as a function of said digitalized Back-EMF signals being above or below a respective threshold, to drive said PWM modulated drive signals in a phased relationship with said digitalized Back-EMF signals, where said digitalized Back-EMF signals having a first time between two consecutive homologous edges of the digitalized Back-EMF signals and a second time between two consecutive opposed edges of the digitalized Back-EMF signals, and to control said respective threshold by reducing an error between said second time and a fraction of said first time.

As used herein, reference to "at least one processor device" is intended to highlight the possibility for the present invention to be implemented in modular and/or distributed form.

One or more embodiments may provide an arrangement for automatically selecting a correct comparison threshold for each motor phase in order to improve Back-EMF sensing during PWM on-time.

In one or more embodiments, a correct comparison threshold for each motor phase may be automatically selected in order to improve Back-EMF sensing during PWM on-time without using additional external circuitry and with a low computational load.

In one or more embodiments, action of a controller may compensate for errors due to, e.g., variable attenuation introduced by low-pass filtering according to motor speed, the use of low precision resistors for voltage divider, the use of a virtual neutral point, and/or variations in power supply voltage.

BRIEF DESCRIPTION OF THE DRAWINGS

One or more embodiments will now be described, purely by way of non-limiting example, with reference to the annexed figures, wherein.

DETAILED DESCRIPTION

In the ensuing description one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the scope of protection or the scope of the embodiments.

Figure 1:
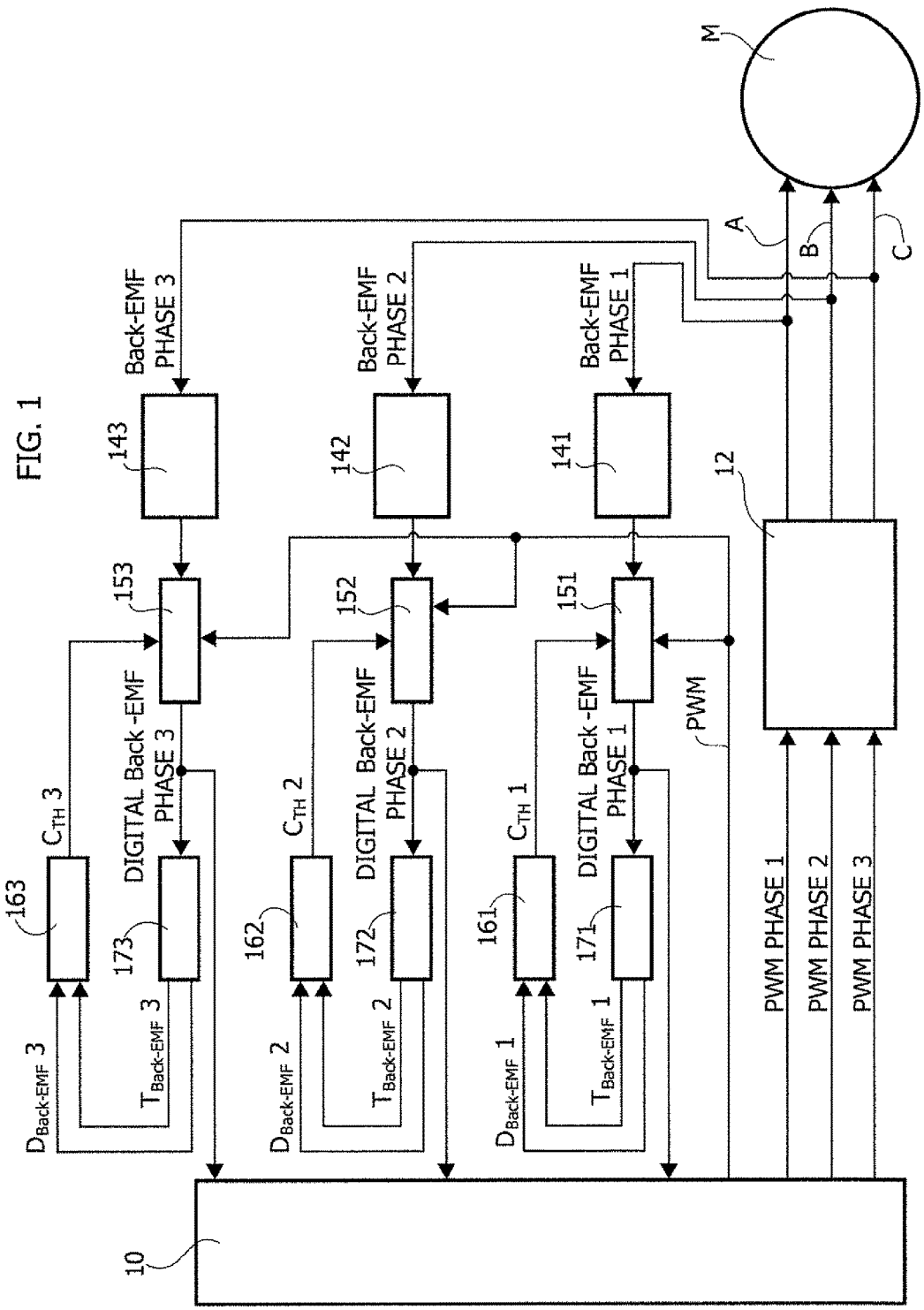
FIG. 1 is a general block diagram of a control arrangement for a brushless DC motor.
Figure 6:
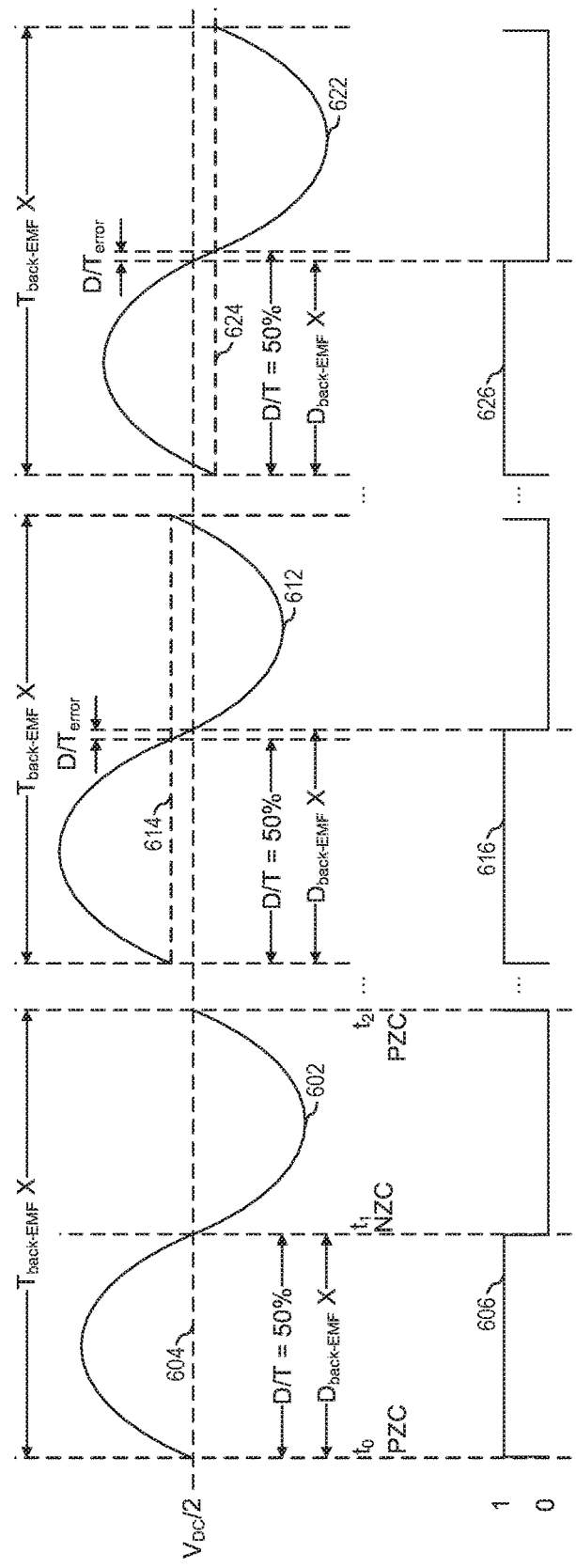
FIG. 6 show waveforms of the arrangement of FIG. 1.

FIG. 1 is a general block diagram of a control arrangement for a brushless DC (BLDC) motor indicated by M. BLDC motors are electronically commutated motors with a linear current/voltage to torque/speed relationship. FIG. 6 show waveforms of the arrangement of FIG. 1.

In a particular arrangement as exemplified in FIG. 1, a BLDC motor (per se not a part of one or more embodiments) may be driven by a main controller 10 via a three-phase inverter 12, e.g., by resorting to six-step commutation for low-end application.

In an arrangement as exemplified in FIG. 1, the controller 10 may send towards the inverter 12, e.g., three PWM-modulated (current) drive signals PWM PHASE 1, PWM PHASE 2 and PWM PHASE 3 (i.e. one for each one of the motor "phases" A, B, C). An exemplary commutation phase sequence may be AB-AC-BC-BA-CA-CB with the conducting intervals for each phase equal to 120 electrical degrees. In such an arrangement, only two of the phases will conduct current at each time while the third phase is floating.

In order to produce maximum torque, the three-phase inverter 12 may be commutated every sixty electrical degrees so that each motor phase current is in phase with the Back-EMF. Commutation timing is determined by the rotor position, which can be determined every sixty electrical degrees by detecting zero crossings of Back-EMF on the floating phase of the motor.

To that effect, Back-EMF signals for each of the phases, i.e., Back-EMF PHASE 1, Back-EMF PHASE 2, Back-EMF PHASE 3 may be detected and fed back towards the main controller 10.

As indicated, each Back-EMF signal can be detected during PWM off-time or during PWM on-time. During PWM off-time, the terminal voltage at the floating phase is directly proportional to the phase Back-EMF, while during PWM on-time it is directly proportional to back EMF voltage plus half the DC bus voltage $V_{DC}$.

Documents such as, e.g., Shao, J.: "An Improved Microcontroller-Based Sensorless Brushless DC (BLDC) Motor Drive for Automotive Applications" IEEE Transactions on Industry Applications, VOL. 42, NO. 5, 2006 may be referred to for further detail on arrangements as described in the foregoing.

In one or more embodiments as exemplified in FIG. 1, the Back-EMF signals of Back-EMF PHASE 1, Back-EMF PHASE 2, and Back-EMF PHASE 3 may be sensed via sensing circuits 141, 142 and 143, and possibly adapted to perform a conditioning action so that the sensing signal lies within a desired voltage range and/or has overlapped noise removed.

Figure 2:
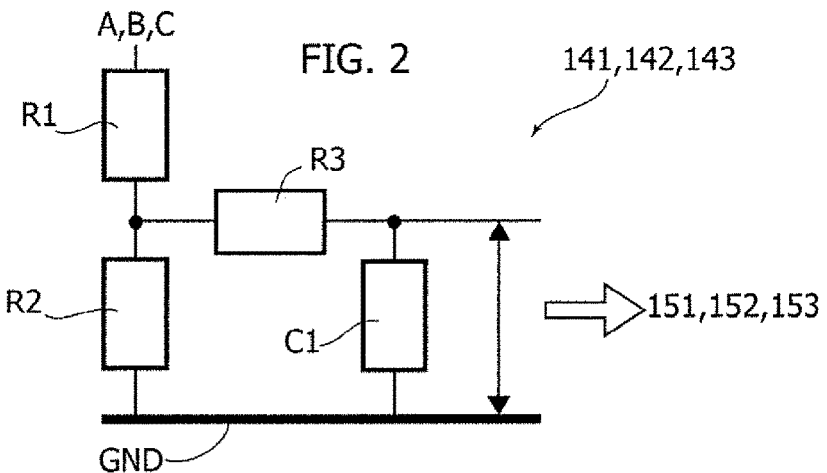
FIG. 2 is a block diagram exemplary of possible details of the arrangement of FIG. 1.

FIG. 2 is exemplary of an optional, yet not mandatory, sensing arrangement of sensing circuits 141, 142 and 143 (for the Back-EMF for phases A, B and C, respectively), including a voltage divider having resistors R1, R2, and a RC low-pass filter fed with the output from the voltage divider R1, R2 and including a resistor R3 and a capacitor C1.

Back-EMF zero-cross events in one motor phase occur twice for each electrical "round." The first event is a positive zero-cross (PZC) and the second event is a negative zero-cross (NZC). For example, FIG. 6 shows a PZC at times $t_0$ and $t_2$, and an NZC at time $t_1$. Based on this concept, the Back-EMF signal for each motor phase can be digitalized, e.g., so as to assume a first value (e.g., a high level or "1") when the Back-EMF signal is greater than the comparison threshold and a second value (e.g., low level or "0") when the back-EMF signal is lower than the comparison threshold. For example, FIG. 6 shows Back-EMF waveforms 602, 612, and 622, digitalized Back-EMF signals 606, 616, and 626 and comparison thresholds 604, 614, and 624.

Conversion to digital back-EMF signals may involve, for example, a threshold comparator. Three exemplary comparator blocks 151, 152, and 153 are thus shown in the diagram of FIG. 1 fed with the output signals from the blocks 141, 142, and 143 for phases A, B, and C, respectively.

In one or more embodiments, the digitalized Back-EMF values generated in the comparator blocks 151, 152 and 153 may be sent to the main controller 10 to be used therein in generating the drive signals PWM PHASE 1, PWM PHASE 2, and PWM PHASE 3, for the phases A, B and C of the motor M.

Those of skill in the art will appreciate that, while the usual designation "zero-cross" may be used herein in connection with, e.g., positive zero-cross (PZC) and negative zero-cross (NZC) events, the events considered herein may be related to crossing in the positive and in the negative direction a threshold which may be non-zero (e.g., $V_{DC}/2$, $C_{TH}$ X). For instance, a notional comparison threshold for detecting the positive and the negative "zero-cross" events, during PWM on-time, may be set to the half of DC bus voltage $V_{DC}/2$ for each motor phase.

A correct comparison threshold, that is a comparison threshold adapted to ensure correct operation of the motor, may be different from the theoretical value and different for each motor phase. As indicated, this may be due to various factors such as, e.g., a variable attenuation introduced by low-pass filtering according to motor speed, errors due to the use of low precision resistors for voltage dividers, errors due to the use of a virtual neutral point, and/or errors due to variations in the power supply voltage.

Figure 3:
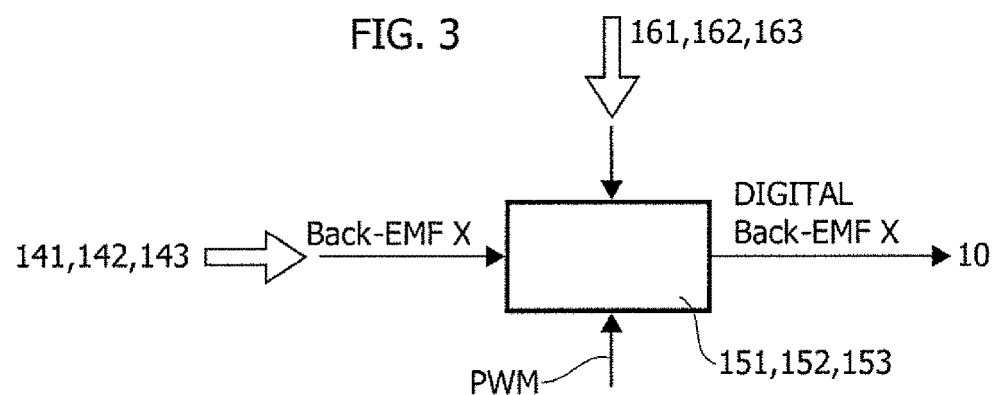
FIG. 3 is a further block diagram exemplary of possible details of the arrangement of FIG. 1.

In one or more embodiments, the comparison thresholds for the comparator blocks 151, 152, and 153 (for phases A, B, and C, respectively) may not be fixed but made variable (e.g., programmable). This is schematically illustrated in FIG. 3, where a block exemplary of any of the comparator blocks 151, 152, and 153 is shown receiving, in addition to a PWM trigger signal from the main controller 10, which enables the comparator block to identify the PWM on-time during which the Back-EMF is sensed, a variable threshold value as generated by a controller block 161, 162, and 163.

The controller blocks 161, 162, and 163 are in turn sensitive to output signals from measurements blocks 171, 172, and 173 phases A, B, and C, respectively.

In the exemplary representation of FIG. 1, three separate processing chains 141, 151, 161, 171; 142, 152, 162, 172; and 143, 153, 163, 173, are shown for phases A, B, and C for the sake of simplicity.

In one or more embodiments these chains may be incorporated wholly or partly to a single processing entity adapted to process the phases A, B, and C (e.g., in a time-division processing arrangement). That is, one or more embodiments may include a single controller for all three motor phases or three independent controllers (one for each motor phase). In one or more embodiments, a single comparison threshold may be used for all of the phases by deciding to compensate only certain errors, e.g., those introduced by using a virtual neutral point or by the power supply, or those errors that affect equally all of the three phases, by neglecting other types of errors.

Figure 4:
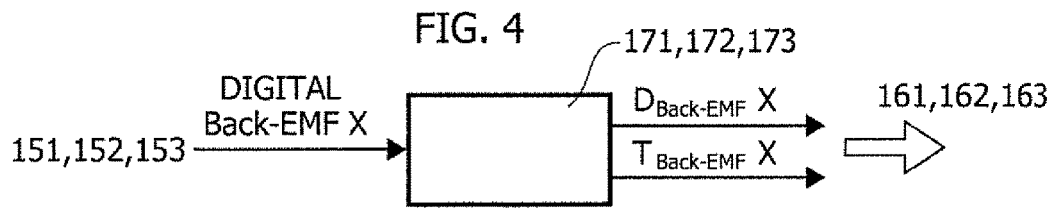
FIG. 4 is another block diagram exemplary of possible details of the arrangement of FIG. 1.
Figure 5:
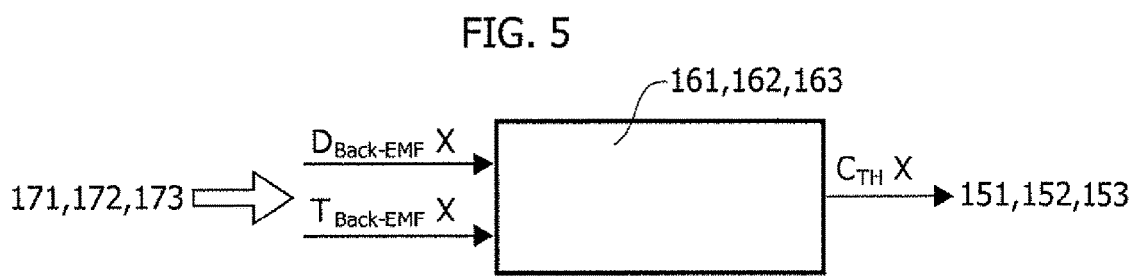
FIG. 5 is a further block diagram exemplary of possible details of the arrangement of FIG. 1.

The diagrams of FIGS. 4 and 5 are exemplary of the DIGITAL Back-EMF X signal from one of the comparators 151, 152, 153 being processed, in a respective one of the measurement circuits 171, 172, 173, to generate two signals $D_{Back-EMF}$ X and $T_{Back-EMF}$ X, for example, as shown in FIG. 6, which are fed to a respective one of the controller blocks 161, 162, 163, which in turn generate threshold control signals $C_{TH}$ X, for example as shown in FIG. 6 for the comparators 151, 152, 153, respectively. Here, X is an index identifying the three phases, e.g., X=1, 2, and 3 for phases A, B, and C, respectively.

That is, in one or more embodiments as exemplified in FIG. 1:
- the DIGITAL Back-EMF 1 signal from the comparator 151 will be processed in the measurement circuit 171 to generate two signals $D_{Back-EMF}$ 1 and $T_{Back-EMF}$ 1 fed to the block 161 to generate a threshold control signal $C_{TH}$ 1 for the comparator 151;
- the DIGITAL Back-EMF 2 signal from the comparator 152 will be processed in the measurement circuit 172 to generate two signals $D_{Back-EMF}$ 2 and $T_{Back-EMF}$ 2 fed to the block 162 to generate a threshold control signal $C_{TH}$ 2 for the comparator 152; and
- the DIGITAL Back-EMF 3 signal from the comparator 153 will be processed in the measurement circuit 173 to generate two signals $D_{Back-EMF}$ 3 and $T_{Back-EMF}$ 3 fed to the block 163 to generate a threshold control signal $C_{TH}$ 3 for the comparator 153.

In one or more embodiments, the comparison in the comparator blocks 151, 152, 153 may be triggered by the PWM trigger signal synchronous with the PWM "on" time, with the result of comparison (low level signal or high level signal) held until the next comparison.

The digitalized Back-EMF signal, that is DIGITAL Back-EMF X for each motor phase may thus be a PWM signal with a period $T_{Back-EMF}$ X equal to the time between the occurrence of one PZC and the next PZC, and a "duty cycle" signal, which may be equal, e.g., to the time $D_{Back-EMF}$ X between the occurrence of one PZC and the following NZC (i.e., the time the signal is "high") or the time between the occurrence of one NZC and the following PZC (i.e., the time the signal is "low"). For example, FIG. 6 shows Back-EMF waveforms 602, 612, and 622, digitalized Back-EMF signals 606, 616, and 626 and comparison thresholds 604, 614, and 624, and period $T_{Back-EMF}$ X and time $D_{Back-EMF}$ X.

Once again, it will be appreciated that the "zero" crossing events (PZC, NZC) in question will in fact take place against thresholds which will be generally non-zero thresholds. Also, referring to the signal $D_{Back-EMF}$ X as a "duty cycle" signal takes into account that the value of such a signal (e.g., ratio of that signal to the period $T_{Back-EMF}$ X) identifies the duty cycle of the relative signal.

The values $D_{Back-EMF}$ X and $T_{Back-EMF}$ X may thus be measured by the measurement circuits 171, 172, 173 (see e.g., FIG. 4).

In one or more embodiments such a measurement may include, for example, a timer/counter to measure the time $T_{Back-EMF}$ X between two consecutive rising edges of the digitalized Back-EMF signal DIGITAL Back-EMF X and the time $D_{Back-EMF}$ X between a rising edge and the following falling edge of the same signal.

In one or more embodiments, the homologous consecutive edges used to measure the time $T_{Back-EMF}$ X may be, in the place of two consecutive rising edges of the digitalized Back-EMF signal DIGITAL Back-EMF X, two consecutive falling edges of the same signal.

Similarly, in one or more embodiments, the opposed consecutive edges used to measure the time $D_{Back-EMF}$ X may be, in the place of a rising edge and the following falling edge the digitalized Back-EMF signal DIGITAL Back-EMF X, a falling edge and the following rising edge of the same signal.

In one or more embodiments, a correct comparison threshold will result in the value of the duty cycle signal $T_{Back-EMF}$ X being equal to the half the value of the period signal $T_{Back-EMF}$ X, i.e., $D_{Back-EMF}$ X=$T_{Back-EMF}$ X/2 (for all of the three phases, i.e., with X=1, 2, 3 for phases A, B, and C, respectively).

On the contrary, by assuming that the signal $D_{Back-EMF}$ X is defined as "high level" time:
- if the comparison threshold selected is higher than the correct comparison threshold, the value of the duty cycle signal $D_{Back-EMF}$ X, will be lower than half the value of the period signal $T_{Back-EMF}$ X ($D_{Back-EMF}$ X<$T_{Back-EMF}$ X/2),
- if the comparison threshold selected is lower than the correct comparison threshold, the value of the duty cycle signal $D_{Back-EMF}$ X, will be higher than half the value of the period signal $T_{Back-EMF}$ X ($D_{Back-EMF}$ X>$T_{Back-EMF}$ X/2).

Complementary relationships will apply if the signal $D_{Back-EMF}$ X is defined as "low level" time.

In one or more embodiments, for each motor phase A, B, and C both the duty cycle signal $D_{Back-EMF}$ X and the period signal $T_{Back-EMF}$ X may be measured and a controller 161, 162, 163 (see e.g., FIG. 5) implemented in order to select the correct value of the relevant comparison threshold.

In one or more embodiments, the controllers may be, e.g., PID controllers (implemented in any known manner for that purpose) where the reference is the signal $T_{Back-EMF}$ X, the input is the signal $D_{Back-EMF}$ X, and the output is the value of the relevant comparison threshold $C_{TH}$ X.

In this case, a PID controller will select the correct comparison threshold $C_{TH}$ value in order to minimize the error defined as E=$D_{Back-EMF}$ X−$T_{Back-EMF}$ X/2 and the initial value of the relevant selected comparison threshold may be set to the theoretical value $V_{DC}/2$. For example, FIG. 6 shows D/Terror, also referred as E, the initial value of the relevant selected comparison threshold 604, and correct comparison thresholds $C_{TH}$ 614 and 624 for illustrating when E is positive or negative.

In one or more embodiments, the values for $D_{Back-EMF}$ X and $T_{Back-EMF}$ X may be obtained as exemplified in the foregoing, e.g., via a timer/counter triggered by consecutive edges (either homologous, e.g., both of them being either rising or falling edges for $T_{Back-EMF}$ X, or opposed, e.g., one being a rising edge and the other a falling or vice-versa for $D_{Back-EMF}$ X) of the DIGITAL Back-EMF X signals.

In one or more embodiments, the values for $D_{Back-EMF}$ X and $T_{Back-EMF}$ X may be derived from other signals that convey equivalent information, e.g., by measuring the time between two consecutive threshold crossing ("zero-cross") events of the Back-EMF signals Back-EMF PHASE 1, Back-EMF PHASE 2, Back-EMF PHASE 3, before these are converted to digital. Again, these threshold crossing events may be either homologous crossing events (e.g., both in the positive direction or both in the negative direction), or opposed (e.g. one in the positive direction and the other in the negative direction or vice-versa), for $T_{Back-EMF}$ X and $D_{Back-EMF}$ X, respectively.

In one or more embodiments, a value for $T_{Back-EMF}$ X may also be obtained from the motor speed (the period being the reciprocal of the rotation frequency) as sensed by any known means.

In one or more embodiments, the output of the controller may also be a correction value of the comparison threshold $C_{TH}$ X, i.e., the correct comparison threshold $C_{TH}$ X may be defined as the sum of controller output and the theoretical value $V_{DC}/2$.

In one or more embodiments, the controller may execute its activity once for a fixed number of electrical rounds.

In one or more embodiments, after a transient time depending on the characteristics of the controller and/or the controller execution frequency, the value of the comparison threshold ($C_{TH}$ X) may be set to the correct value for each motor phase, with the controller switched off to reduce the computational load.

Without prejudice to the underlying principles, the details and embodiments may vary, even significantly, with respect to what is illustrated herein purely by way of non-limiting example, without thereby departing from the extent of protection.

The invention claimed is:

1. A method of driving a DC motor by PWM modulated drive signals, the method comprising:
   producing digitalized Back-EMF signals having first and second values by comparing Back-EMF signals with a respective variable threshold, the respective variable threshold having an initial value;
   driving PWM modulated drive signals in a phased relationship with the digitalized Back-EMF signals, each of the digitalized Back-EMF signals having a first time between two consecutive homologous edges of respective digitalized Back-EMF signals and a second time between two consecutive opposed edges of respective digitalized Back-EMF signals, wherein the homologous edges of the digitalized Back-EMF signals and the opposed edges of the digitalized Back-EMF signals are edges of the digitalized Back-EMF signals corresponding to transitions across the respective variable threshold;
   measuring the first time and the second time with a measuring unit; and
   after measuring the first time and the second time, controlling the respective variable threshold by reducing an error between the measured second time and a fraction of the measured first time.

2. The method of claim 1, wherein the fraction of the measured first time comprises half of the measured first time.

3. The method of claim 1, wherein controlling the respective variable threshold comprises implementing a controller, wherein a reference comprises the measured first time, an input comprises the measured second time, and an output comprises a value for the respective variable threshold.

4. The method of claim 1, wherein
   the measuring unit comprises a counter;
   measuring the first time comprises producing a first time count between two homologous edges of a digitalized Back-EMF signal; and
   measuring the second time comprises producing a second time count between two consecutive opposed edges of the digitalized Back-EMF signal of the digitalized Back-EMF signals.

5. The method of claim 1, wherein the initial value is $V_{DC}/2$, wherein $V_{DC}$ comprises a DC bus voltage for each motor phase.

6. The method of claim 5, wherein the fraction of the measured first time comprises half of the measured first time.

7. The method of claim 1, wherein controlling the respective variable threshold comprises generating a controlled value as a sum of a controlled output and a reference value for the respective variable threshold, with the reference value set to $V_{DC}/2$, wherein $V_{DC}$ comprises a DC bus voltage for each motor phase.

8. The method of claim 1, further comprising deriving the first time from a time between two consecutive homologous crossing events of the respective variable threshold by a digitalized Back-EMF signal of the digitalized Back-EMF signals.

9. The method of claim 1, further comprising deriving the first time from a motor speed.

10. The method of claim 1, further comprising deriving the second time from a time between two consecutive opposed crossing events of the respective variable threshold by a digitalized Back-EMF signal of the digitalized Back-EMF signals.

11. The method of claim 1, further comprising controlling the respective variable threshold once for a fixed number of electrical rounds of a driven motor, wherein each electrical round of the driven motor corresponds with a time between two homologous edges of a digitalized Back-EMF signal of the digitalized Back-EMF signals.

12. The method of claim 1, further comprising discontinuing controlling the respective variable threshold to reduce a computational load associated therewith.

13. A driver device for driving a DC motor by PWM modulated drive signals, the driver device comprising:
   a plurality of comparator circuits configured to produce respective digitalized Back-EMF signals by comparing respective Back-EMF signals with a respective threshold;
   a plurality of measuring units, each measuring unit coupled to respective comparator circuits, each measuring unit configured to
      measure a respective first time between two consecutive homologous edges of the respective digitalized Back-EMF signal, and measure a respective second time between two consecutive opposed edges of the respective digitalized Back-EMF signal, the homologous edges of the respective digitalized Back-EMF signals and the opposed edges of the respective digitalized Back-EMF signals being edges of the respective digitalized Back-EMF signals corresponding to transitions across the respective threshold;

an inverter configured to drive the PWM modulated drive signals in a phased relationship with the respective digitalized Back-EMF signals; and a plurality of controller circuits configured to control the respective threshold based on the respective first time and the respective second time.

14. The driver device of claim 13, further comprising a plurality of conditioning circuits, each conditioning circuit having an output coupled to a respective comparator circuit of the plurality of comparators circuits, each conditioning circuit comprising a voltage divider and a noise removal lowpass filter.

15. The driver device of claim 13, wherein the driver device is configured to sense Back-EMF signals from the DC motor to generate the PWM modulated drive signals.

16. A non-transitory computer readable medium storing instructions that when executed are configured to cause at least one processor to:

produce digitalized Back-EMF signals having first and second values by comparing Back-EMF signals with a respective threshold having an initial value;

drive PWM modulated drive signals in a phased relationship with the digitalized Back-EMF signals, the digitalized Back-EMF signals having a first time between two consecutive homologous edges of the digitalized Back-EMF signals and a second time between two consecutive opposed edges of the digitalized Back-EMF signals, wherein the homologous edges of the digitalized Back-EMF signals and the opposed edges of the digitalized Back-EMF signals are edges of the digitalized Back-EMF signals corresponding to transitions across the respective threshold;

measure the first time and the second time with a measuring unit; and after measuring the first time and the second time, control the respective threshold by reducing an error between the measured second time and a fraction of the measured first time.

17. The non-transitory computer readable medium of claim 16, wherein the fraction of the measured first time comprises half of the measured first time.

18. The non-transitory computer readable medium of claim 16, further comprising instructions to produce a first time count between two homologous edges of a first digitalized Back-EMF signal of the digitalized Back-EMF signals to measure the first time and a second time count between two consecutive opposed edges of the first digitalized Back-EMF signal to measure the second time.

19. The non-transitory computer readable medium of claim 16, further comprising instructions to set the initial value to $V_{DC}/2$, wherein $V_{DC}$ comprises a DC bus voltage for each motor phase.

20. The non-transitory computer readable medium of claim 16, further comprising instructions to control said respective threshold by generating a controlled value as a sum of a controlled output and a reference value for said respective threshold, with said reference value set to $V_{DC}/2$, wherein $V_{DC}$ comprises a DC bus voltage for each motor phase.

* * * * *